United States Patent
Yoshii et al.

(10) Patent No.: US 7,311,403 B2
(45) Date of Patent: Dec. 25, 2007

(54) OPTICAL MEMBER, ILLUMINATING DEVICE, AND PROJECTION TYPE VIDEO DISPLAY

(75) Inventors: Shouichi Yoshii, Osaka (JP); Yoshitaka Kurosaka, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 317 days.

(21) Appl. No.: 11/086,319

(22) Filed: Mar. 23, 2005

(65) Prior Publication Data
US 2005/0219478 A1   Oct. 6, 2005

(30) Foreign Application Priority Data
Mar. 30, 2004  (JP) ............................. 2004-101329
Feb. 25, 2005  (JP) ............................. 2005-051042

(51) Int. Cl.
  *G03B 21/28*  (2006.01)
  *F21V 9/00*   (2006.01)
(52) U.S. Cl. ............................. 353/31; 353/37; 353/99; 362/231; 362/293
(58) Field of Classification Search .................. 353/20, 353/30–31, 98, 99, 37; 362/231, 293
See application file for complete search history.

(56) References Cited
U.S. PATENT DOCUMENTS 5,073,013 A * 12/1991 Sonehara et al. .............. 349/8
6,067,128 A * 5/2000 Imai .............................. 349/8
6,869,190 B2 * 3/2005 Goto et al. ................... 353/85
7,066,600 B2 * 6/2006 Nakashima et al. .......... 353/20
7,070,281 B2 * 7/2006 Kato ............................ 353/20
7,070,300 B2 * 7/2006 Harbers et al. ............. 362/231
2003/0147055 A1 * 8/2003 Yokoyama ................... 353/98

FOREIGN PATENT DOCUMENTS

JP       2002-189263     7/2002

* cited by examiner

*Primary Examiner*—Christopher Mahoney
(74) *Attorney, Agent, or Firm*—McDermott Will & Emery LLP

(57) ABSTRACT

A projection type video display is provided with three LED light sources. Lights emitted from each LED light source are guided into a light incidence surface of a rod integrator by a cross dichroic mirror. In a first light incidence area (an area opposite to a LED light source in red) of the cross dichroic mirror, a first dichroic mirror is provided, and in a second light incidence area (an area opposite to a LED light source in blue) of the cross dichroic mirror, a second dichroic mirror is provided. The first dichroic mirror transmits the light in red and reflects lights in other colors, and the second dichroic mirror transmits the light in blue and reflects lights in other colors.

20 Claims, 3 Drawing Sheets

OPTICAL MEMBER, ILLUMINATING DEVICE, AND PROJECTION TYPE VIDEO DISPLAY

BACKGROUND OF THE INVENTION

Field of the Invention

The present invention relates to an optical member, an illuminating device and a projection type video display. Generally, an illuminating device used for a liquid crystal projector, and others is formed of a lamp such as an ultra-high pressure mercury lamp, a metal halide lamp, a xenon lamp, and etc., and a parabolic reflector that renders the irradiating light a parallel light. In addition, in such the illuminating device, in order to reduce a non-uniformity of a light amount from an irradiating surface, there is an integrating function by a pair of fly's eye lenses (referred to as a function for superimposing and converging on an object to be illuminated plural illuminating areas in a predetermined shape formed by an optical device in a sampling manner within a plane surface). Furthermore, in recent years, it is attempted to use a light-emitting diode (LED) as the light source (JP-A-2002-189263).

SUMMARY OF THE INVENTION

In an illuminating device and a projection type video display, it is desirable to efficiently utilize light emitted from a light source.

In view of the above-described circumstance, it is an object of the present invention to provide an optical member capable of increasing a utilization efficiency of emitted light from a light source, an illuminating device having the optical member, and a projection type video display having this illuminating device.

In order to solve the above-described problem, an optical member of the present invention comprises an optical path changing member having first and second light incidence areas to be faced to each other, one light exit area, and a third light incidence area that faces said light exit area, guiding lights in respective colors incident from each light incidence area to the approximately same direction, and emitting from the light exit area; a first dichroic mirror that is provided in the first light incidence area, and transmits a color in red, and reflects the lights other than in red; and a second dichroic mirror that is provided in the second light incidence area, and transmits a light in blue, and reflects lights other than in blue.

With the above-described configuration, out of the lights other than in red incident on the optical path changing member, a light attempting to exit from the first light incidence area is reflected by the first dichroic mirror. Similarly, out of the lights other than in blue incident on the optical path changing member, a light attempting to exit from the second light incidence area is reflected by the second dichroic mirror. As a result of these reflected lights exiting from the light exit surface of the light optical path changing member, a utilization efficiency of light is increased.

In the optical member of the above-described configuration, the first dichroic mirror may be optically designed in such a manner as to reflect a light in red within a range of predetermined angles out of the light in red that is once incident in the optical path changing member and returns therefrom, and the second dichroic mirror is optically designed in such a manner as to reflect a light in blue within a range of predetermined angles out of the light in blue that is once incident in the optical path changing member and returns therefrom.

In the optical member of these configurations, the optical path changing member may be a cross dichroic mirror. Or, the optical path changing member may be a cross dichroic prism. In the optical member of these configurations, the first dichroic mirror and the second dichroic mirror may be arranged in not parallel with each other.

An illuminating device of the present invention comprises any one of the optical members mentioned above, a light source in red arranged in the first light incidence area, a light source in blue arranged in the second light incidence area, and a light source in green arranged in the third light incidence area.

In the above-described illuminating device, it is desirable that a part of a light in green incident from the third light incidence area is emitted from a light exit area of the optical member after being reflected by the first dichroic mirror or the second dichroic mirror.

Moreover, the illuminating device of these configurations may further comprise a light integrator that renders uniform an intensity of lights in respective colors emitted from the optical member on an object to be illuminated.

The light integrator may be a rod integrator structured of being hollow or non-hollow. In such the configuration, at least one of the first dichroic mirror and the second dichroic mirror, and a side surface of the rod integrator may be in parallel The light integrator may be formed of one pair of fly's eye lenses.

Furthermore, in an illuminating device of these configurations, as the light source, a solid light-emitting element may be used.

An illuminating device of these configurations may be structured of always emitting a light in red, a light in green, and a light in blue when the illuminating device is turned on (Hereinafter, referred to as a first configuration in this section). Or, the illuminating device of these configurations may be structured of sequentially emitting a light in red, a light in green, and a light in blue for a predetermined time period when the illuminating device is turned on (Hereinafter, referred to as a second configuration in this section).

Furthermore, a projection type video display of the present invention comprises the illuminating device according to the first configuration, one full color light valve, a projecting means for projecting an image light obtained by being passed through the full color light valve.

In addition, a projection type video display of the present invention comprises the illuminating device according to the second configuration, one light valve, a supplying means for supplying a video signals for respective colors in synchronous with emitting timings of the lights in respective colors, and a projecting means for projecting an image light obtained by being passed through the light valve.

In any one of the above-mentioned illuminating devices, members such as a circuit board, a storing apparatus, an external-equipment attaching portion, and others may be arranged in the vicinity of the light source in red. Moreover, in any one of the above-mentioned projection type video displays, members such as a circuit board, a storing apparatus, an external-equipment attaching portion, and others may be arranged in the vicinity of the light source in red Any one of the above-mentioned illuminating devices may be driven by a primary battery or a secondary battery.

Moreover, any one of the above-mentioned projection type video displays may be driven by a primary battery or a secondary battery.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described based on FIG. 1 to FIG. 5.

Figure 1:
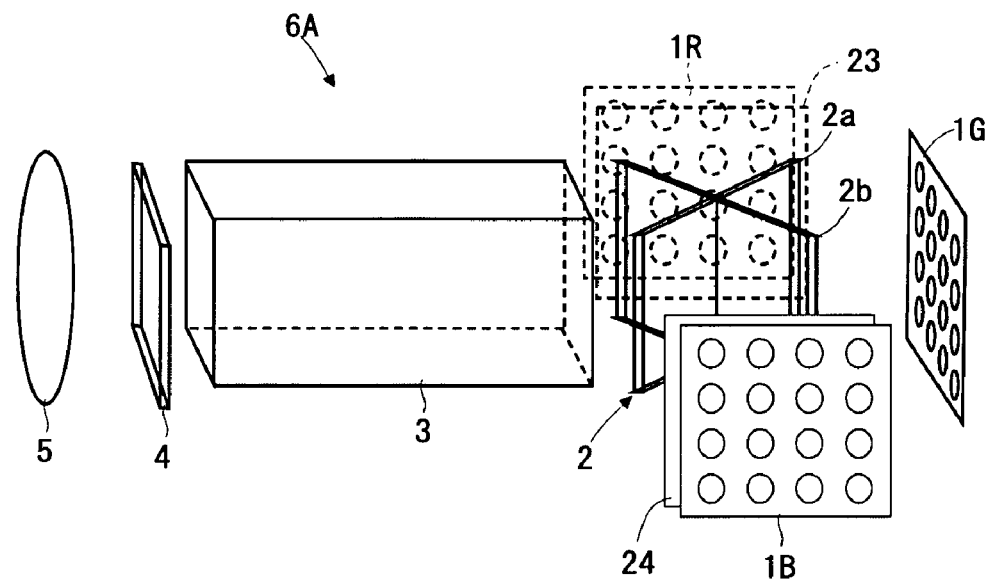
FIG. 1 is a descriptive diagram showing an optical system of a projection type video display (illuminating device) of an embodiment of the present invention.
Figure 3:
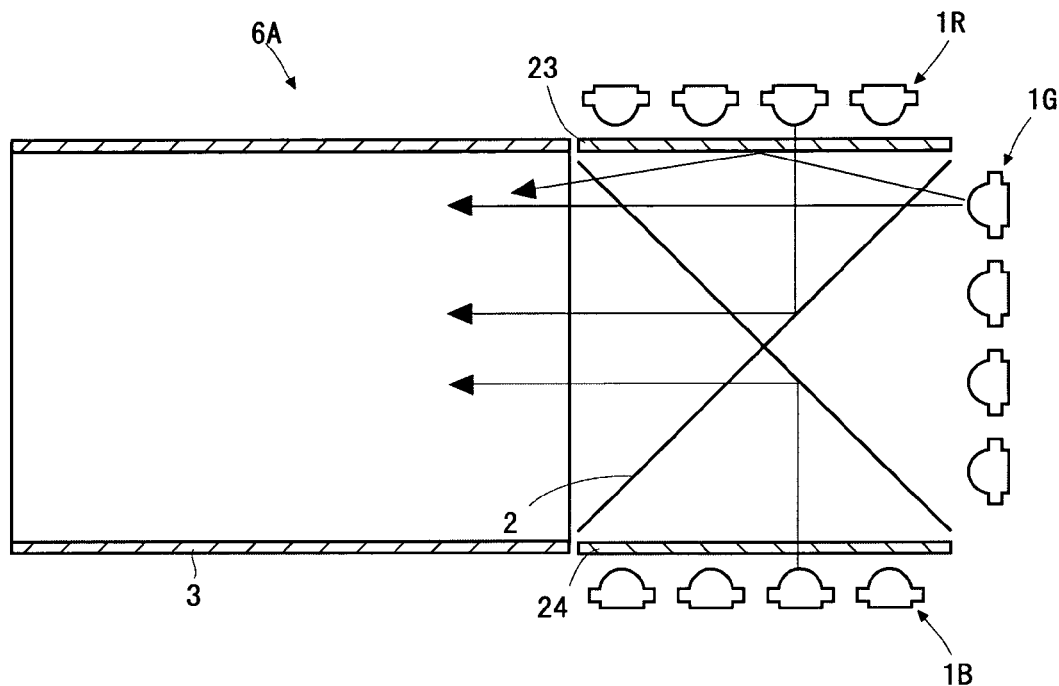
FIG. 3 is a plane view showing an optical system of a projection type video display (illuminating device) of an embodiment of the present invention.

FIG. 1 is a perspective view showing an optical system of a single-panel projection type video display 6A, and FIG. 3 is an enlarged view of an illuminating device of the projection type video display. The projection type video display 6A is provided with three LED light sources 1R, 1G, and 1B (Hereinafter, a numeral "1" is used when not specifying each LED light source). Each LED light source 1 has structure in which LEDs (light-emitting diodes) are arranged in an array shape. A horizontal to vertical ratio of each LED light source 1 may be approximately equal to the horizontal to vertical ratio of a liquid crystal panel 4. The LED light source 1R emits a light in red, the LED light source 1G emits a light in green, and the LED light source 1B emits a light in blue. The LED light source 1G is provided to be faced with a light incidence surface of a rod integrator 3, and a cross dichroic mirror 2 is sandwiched therebetween, and the LED light source 1R and the LED light source 1B are provided to be faced to each other, and the cross dichroic mirror 2 is sandwiched therebetween. That is, in a first light incidence area of the cross dichroic mirror 2, the LED light source 1R is provided, in a second light incidence area, the LED light source 1B is provided, and in a third light incidence area, the LED light source 1G is arranged. It is noted that although not shown, it may be possible to increase a utilization efficiency of the emitted light from the LED by providing a mirror plate in a non-light incidence area of the cross dichroic mirror 2.

The cross dichroic mirror 2 is formed such that a first cross dichroic mirror portion 2a and a second cross dichroic mirror portion 2b are in a cross arrangement. The first cross dichroic mirror portion 2a reflects the light in red, and transmits lights other than in red. The second cross dichroic mirror portion 2b reflects the light in blue, and transmits lights other than in blue. For example, the first cross dichroic mirror portion 2a is divided into two portions, and the second cross dichroic mirror portion 2b is sandwiched by the divided two mirror portions.

A surface connecting an edge of each of one end sides (one end side in a light incidence side) of two pieces of the dichroic mirrors 2a, 2b in the cross dichroic mirror 2 is defined as the light incidence area in the cross dichroic mirror 2. The first and second light incidence areas to be faced to each other (a light-in-red incidence area and a light-in-blue incidence area) of the cross dichroic mirror 2 are formed in parallel to each other. Moreover, in the first light incidence area (an area opposite to the LED light source 1R) of the cross dichroic mirror 2, a dichroic mirror 23 is provided, and in the second light incidence area (an area opposite to the LED light source 1B) of the cross dichroic mirror 2, a dichroic mirror 24 is provided. In addition, the dichroic mirrors 23, 24, too, are provided in parallel to each other. The dichroic mirror 23 transmits the light in red, and reflects lights other than in red. In addition, the dichroic mirror 24 reflects transmits the light in blue, and reflects lights other than in blue. As a result of the dichroic mirrors 23, 24 being provided, a utilization efficiency of the light in green emitted from the LED light source 1G is increased. Furthermore, the dichroic mirrors 23, 24 have a function of the rod integrator, and thus, increasing consistency of an illumination light.

A light in color emitted from each LED light source 1 is guided into the light incidence area of the rod integrator 3 by the cross dichroic mirror 2. The rod integrator 3 has rectangular tube structure (hollow structure) of which inner surface is a mirror surface. The horizontal to vertical ratio of at least the light exit area of the rod integrator 3 is approximately equal to the horizontal to vertical ratio of the liquid crystal panel 4. The rod integrator 3 reflects the lights in respective colors from each LED light source 1 on the mirror surface, and guides the lights onto the liquid crystal panel 4 so that a light intensity distribution of the lights in respective colors are rendered approximately uniform on the liquid crystal panel 4 (object to be illuminated).

Side surfaces of the rod integrator 3 are formed in parallel or approximately in parallel with the dichroic mirrors 23, 24. Furthermore, the side surfaces of the rod integrator 3 are formed to be flush with the light incidence area (see FIG. 3). In addition, two non-light incidence areas (an area in which the above-described mirror plate is arranged) to be faced to each other of the cross dichroic mirror 2, too, are formed in parallel to each other, and the side surfaces of the rod integrator 3 are formed in parallel or approximately in parallel with the non-light incidence area. Furthermore, the side surfaces of the rod integrator 3 are formed to be flush with the non-light incidence area. Primary optical axes in the LED light source 1R and the LED light source 1B are perpendicular to each light incidence area. In addition, the primary optical axes in the LED light source 1R and the LED light source 1B intersect at an angle of 45 degrees toward the first cross dichroic mirror portion 2a and the second cross dichroic mirror portion 2b.

The liquid crystal panel 4 has structure having an RGB color filter, or has structure not having the RGB color filter. In a case of using the liquid crystal panel 4 structured of having the RGB color filter, all the LED light sources 1R, 1G, and 1B are simultaneously turned on, and a light in white is guided onto the liquid crystal panel 4. In a case of using the liquid crystal panel 4 structured of not having the RGB color filter, in addition to sequentially turning on the LED light sources 1R, 1G, and 1B in a time-sharing manner for a predetermined time period, a video signal of the respective colors are supplied to the liquid crystal panel 4 in synchronous with a timing of turning on for the predetermined time period.

The light (image light) modulated as a result of passing through the liquid crystal panel 4 is enlarged and projected by a projection lens 5, and displayed on a screen not shown.

The LED light source 1 may be provided with a lens for rendering the light parallel. In addition, the LED light source 1 may use a light source formed of having LED chips arranged in an array shape, and a lens cell (for rendering the light parallel, for example) arranged on a light exit side of each LED chip by a mold, and others. Instead of the array-shaped LED light source 1, a light source formed of one LED may be used.

A polarization conversion system may be provided on the light exit side of the rod integrator 3. The polarization conversion system in this case may be provided with a single PBS (polarizing beam splitter) corresponding to a size of a light exit portion of the rod integrator 3, a mirror provided in parallel with a polarized light separating surface in the PBS, and a retardation plate provided on the light exit side of the mirror or that of the PBS. However, in this case, the size of a light exit portion of the polarization conversion system is two times larger than that of the light exit portion of the rod integrator 3. Therefore, an entire shape of the light exit portion of the polarization conversion system is preferably rendered approximately equal to the horizontal to vertical ratio of the liquid crystal panel. In this case, provided that the horizontal to vertical ratio of the liquid crystal panel is A:B, the horizontal to vertical ratio of the light exit portion of the rod integrator 3 is A:B/2, for example. Furthermore, it may be possible that not only the horizontal to vertical ratio of the light exit portion of the rod integrator 3 but also the horizontal to vertical ratio of the light incidence portion is rendered A:B/2. In this case, by providing an anamorphic optical system between the cross dichroic mirror 2 and the light incidence portion of the rod integrator 3, the horizontal and vertical ratio of a light flux may be adjusted.

Furthermore, the polarization conversion system may be provided on the light exit side of each LED. The polarization conversion system in this case may be provided with the single PBS that is approximately equal to a size of the light exit portion of the LED, the mirror provided in parallel with the polarized light separating surface in the PBS, and the retardation plate provided on the light exit side of the mirror or that of the PBS.

The polarization conversion system may not be limited to an apparatus formed of the single PBS, and the two PBSs may be used toward one LED. In this case, the polarized light separating surface in the two PBSs is provided in a "<" shape (a shape that looks like "<", seen from the side), and the LED is arranged on a tip end side of the "<" shape. In addition, it may be also possible to use the two PBSs toward a plurality of LEDs aligned in one line. In this case, the plurality of LEDs aligned in one line are arranged on the tip end side in the "<" shape. Furthermore, it is possible to use a dielectric multi-layered film or a wire grid as the polarized light separating surface.

Figure 2:
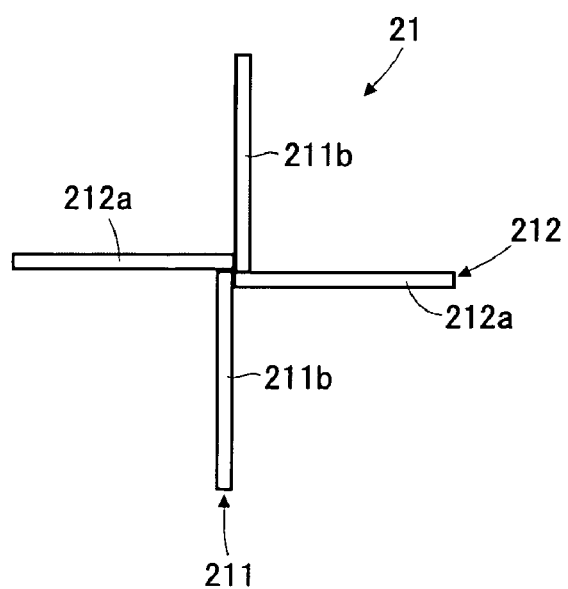
FIG. 2 is a sectional view showing a cross dichroic mirror.

Instead of the cross dichroic mirror 2, a cross dichroic mirror 21 shown in FIG. 2 may be used. The cross dichroic mirror 21 is provided with the first cross dichroic mirror portion 211, and the second cross dichroic mirror portion 212 in a cross arrangement. The first cross dichroic mirror portion 211 reflects the light in red, and transmits lights other than in red. The second cross dichroic mirror portion 212 reflects the light in blue, and transmits lights other than in blue. The first cross dichroic mirror portion 211 is formed of a divided portion 211a and a divided portion 211b, and the second cross dichroic mirror portion 212 is formed of a divided portion 212a and a divided portion 212b. The cross dichroic mirror 21 has structure of the cross arrangement in which these four pieces of the divided portions bring respective corner sides into close contact. As a result of having such the structure, problems (a bordering line (a dark line, a vertical streak is inserted) in the projected video, and others) likely to occur in the cross dichroic mirror 2 are solved.

Figure 4:
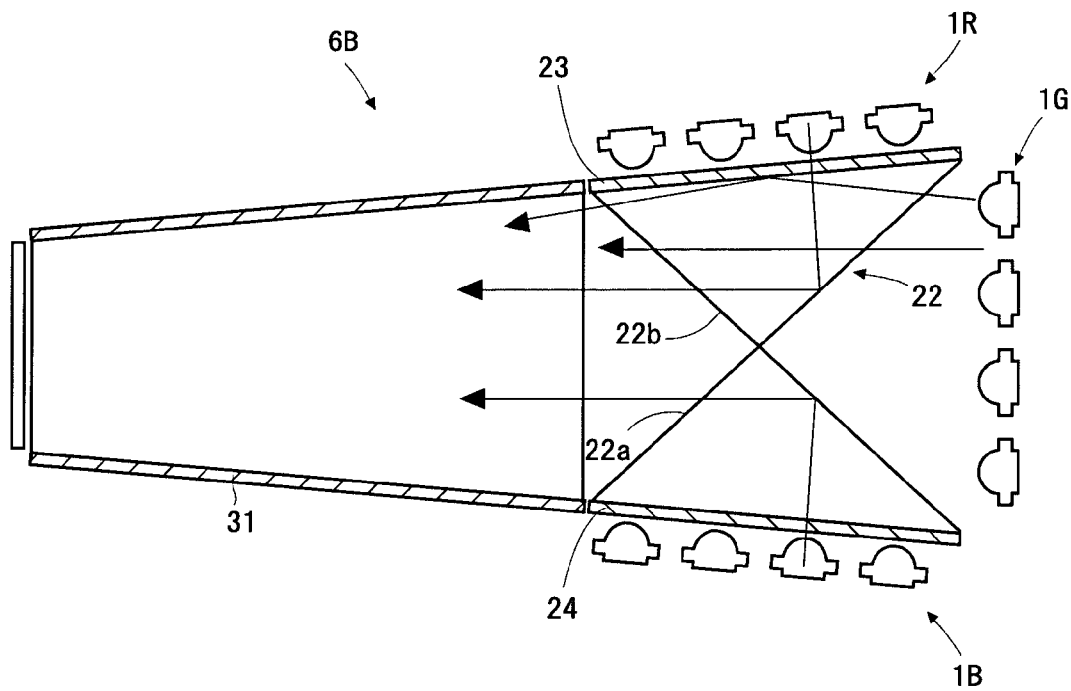
FIG. 4 is a plane view showing an optical system of a projection type video display (illuminating device) of another embodiment of the present invention.

The projection type video display 6B shown in FIG. 4 is provided with a cross dichroic mirror 22 and a rod integrator 31. The cross dichroic mirror 22 has the first and second light incidence areas to be faced to each other formed not in parallel, forming a tapered shape. Furthermore, the two dichroic mirrors 23, 24 are arranged not in parallel with each other corresponding to the first and second light incidence areas not in parallel. Two non-light incidence areas (an area in which the above-described mirror plate is arranged), which are faced to each other, of the cross dichroic mirror 22, too, are formed not in parallel with each other. Only one pair of the first and second light incidence areas to be faced to each other, and the two non-light incidence areas to be faced to each other may be rendered not parallel. Structure having four divided portions shown in FIG. 2 may be adopted to the cross dichroic mirror 22 in the tapered shape.

The light exit area of the cross dichroic mirror 22 is smaller than the third light incidence area. In such the structure, a presence of the dichroic mirrors 23, 24 becomes more effective. Structure in which the light exit area of the cross dichroic mirror 22 is larger than the third light incidence area may be adopted, and in such the structure, it is possible to render small a dispersion angle of the light. In this case, too, the two dichroic mirrors 23, 24 are arranged not in parallel with each other, corresponding to the first and second light incidence areas not in parallel.

Two opposite sides of the rod integrator 31 are formed in parallel or approximately in parallel with the first and second light incidence areas of the cross dichroic mirror 21, forming the tapered shape. Furthermore, the two opposite sides of the rod integrator 31 are formed to be flush with the first and second light incidence areas. The other two opposite-sides of the rod integrator 31 are formed in parallel or approximately in parallel with the non-light incidence area of the cross dichroic mirror 21. Furthermore, the two opposite sides of the rod integrator 31 are formed to be flush with the non-light incidence area. The light exit area of the rod integrator 31 is smaller than the light incidence area thereof. Structure in which the light exit area of the rod integrator 31 is larger than the light incidence area thereof may be adopted, and in such the structure, it is possible to render small a dispersion angle of the light.

In an example of structure shown in FIG. 4, a first cross dichroic mirror portion 22a and a second cross dichroic mirror portion 22b in the cross dichroic mirror 22 intersect at a non-right angle. The primary optical axes of the LED light source 1R and the LED light source 1B are adjusted in such a manner that the primary optical axes of the light source reflected on the cross dichroic mirror portions 22a, 22b are rendered parallel to each other. Needless to say, the first cross dichroic mirror portion 22a and the second cross dichroic mirror portion 22b may intersect at a right angle. In this case, the primary optical axes in the LED light source 1R and the LED light source 1B intersect at an angle of 45 degrees toward each cross dichroic mirror portion.

Figure 5:
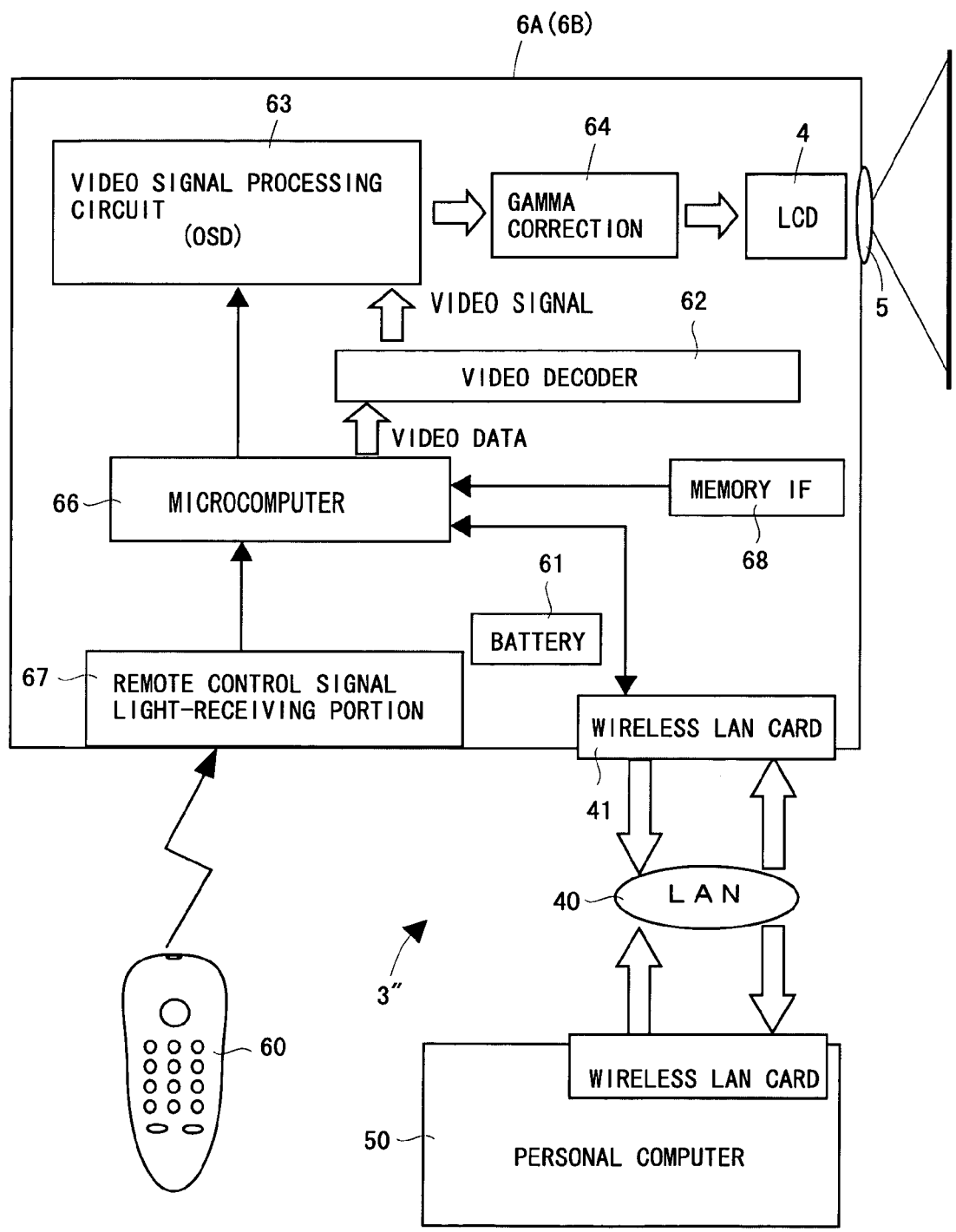
FIG. 5 is a descriptive diagram showing a signal processing system, and others of a projection type video display of an embodiment of the present invention.

FIG. 5 is a descriptive diagram showing one example of a signal processing system of the projection type video displays 6A, 6B. The projection type video display 6 is provided with a video signal processing circuit 63, a gamma correction circuit 64, a liquid crystal panel 4, and others, modulates the light emitted from the LED light source 1 by the liquid crystal panel 4, and projects the light. A battery (a primary battery or a secondary battery) 61 supplies a power to each circuit and the LED light source. A microcomputer 66 of the projection type video display 6 supplies to a video decoder 62 image data (encoded data) received from a personal computer 50 via a wireless LAN card 41, and image data (encoded data) read out from a memory card by a memory interface 68.

The video decoder 62 decodes the encoded data so as to generate the video signal, and supplies the video signal to the video signal processing circuit 63 that contains an OSD (on-screen display). The microcomputer 66, in a case of receiving text data via the wireless LAN card 4, and other cases, is also capable of controlling the video signal processing circuit 63 in such a manner that the text is OSD-displayed. In addition, in the projection type video displays 6A, 6B, a remote control signal light-receiving portion 67 is provided, and it is possible to operate the projection type video displays 6A, 6B by a remote control transmitter 60.

A loading portion of the wireless LAN card 41, a loading portion of the memory card 68, or another circuit board, and others are arranged in the vicinity of the LED light source 1R. Each LED light source 1 generates heat upon emitting the light so that it is preferable that the LED light source is structured of being on a heatsink. In a case of being in view of such light source cooling, an arranging space of the circuit board, and others become narrow if the heatsink is rendered large, for example, and the arranging space of the circuit board, and others become large if the heatsink is rendered small. Herein, the LED light source 1R is a light source having a lower heating amount compared to the other LED light sources. In this embodiment, the loading portion of the wireless LAN card 41, the loading portion of the memory card 68, or another circuit board, and others are arranged in the vicinity of the LED light source 1R, and this arrangement, even if the heatsink for the LED light source 1R becomes small, allows to render small an influence toward the light source cooling. In other words, the projection type video displays 6 is reduced in size so that it is possible to arrange the circuit board, and others closer to the optical system, and render small the influence toward the cooling of the optical system, and etc. Needless to say, such the structure (the structure in which the members such as the circuit board, the storing device, the external-equipment attaching portion, and others are arranged in the vicinity of the light source in red, the structure driven by the primary battery or the secondary battery) is adaptable to the structure as the illuminating device.

In the above descriptions, the projection type video displays 6A, 6B use a transmission type liquid crystal panel, and however, are not limited thereto. In addition, a reflection type liquid crystal panel may be used, and instead of these liquid crystal panels, a type of the display panel that drives on an individual basis a multiplicity of micro mirrors, which are pixels, may be used. Furthermore, the solid light-emitting element is not limited to the light-emitting diode (LED), and an organic or inorganic electroluminescence, and others may be used.

Furthermore, in the above-described illuminating device, it is possible, too, to use a glass rod integrator having non-hollow structure as the light integrator. In addition, an integrator lens formed of one pair of fly's eye lenses may be used as the light integrator. In a case of obtaining sufficient uniformity in the light flux emitted from the light source, the light integrator may be omitted. Instead of the cross dichroic mirror, it is possible to use the cross dichroic prism. Furthermore, the light source is not limited to the solid light-emitting element. Moreover, it may be possible to be provided with a projection-use curved mirror instead of the projection lens. In addition, the cross dichroic mirror 2 (21,22), the dichroic mirror 23, and the dichroic mirror 24 may be integrated.

In addition, the dichroic mirror 23 may be optically designed in such a manner as to reflect the light in red within a range of predetermined angles (from 70 degrees to 90 degrees, for example) out of the light in red that is once incident in the optical path changing member (the cross dichroic prism or the cross dichroic mirror) and returns therefrom. Moreover, the dichroic mirror 24 may be optically designed in such a manner as to reflect the light in blue within a range of predetermined angles (from 70 degrees to 90 degrees, for example) out of the light in blue that is once incident in the optical path changing member and returns therefrom. In a case that the dichroic mirrors 23, 24 are formed of, for example, the dielectric multi-layered film, by adjusting a material, a thickness, the number of layers of the multi-layered film, and others, it is possible to design the range of the predetermined angles.

The present invention exhibits an effect such as increasing the utilization efficiency of light of the light source in the illuminating device and the projection type video display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical member, comprising:
 an optical path changing member having first and second light incidence areas to be faced to each other, one light exit area, and a third light incidence area that faces said light exit area, guiding lights in respective colors incident from each light incidence area to the approximately same direction, and emitting from said light exit area;
 a first dichroic mirror that is provided in said first light incidence area, and transmits a color in red, and reflects the lights other than in red; and
 a second dichroic mirror that is provided in said second light incidence area, and transmits a light in blue, and reflects lights other than in blue.

2. An optical member according to claim 1, wherein said first dichroic mirror is optically designed in such a manner as to reflect a light in red within a range of predetermined angles out of the light in red that is once incident in said optical path changing member and returns therefrom, and said second dichroic mirror is optically designed in such a manner as to reflect a light in blue within a range of predetermined angles out of the light in blue that is once incident in said optical path changing member and returns therefrom.

3. An optical member according to claim 1, wherein said optical path changing member is a cross dichroic mirror.

4. An optical member according to claim 1, an illuminating device wherein said optical path changing member is a cross dichroic prism.

5. An optical member according to claim 1, wherein said first dichroic mirror and said second dichroic mirror are arranged in not parallel with each other.

6. An illuminating device, comprising;
 the optical member according to claim 1;

a light source in red arranged in said first light incidence area;

a light source in blue arranged in said second light incidence area; and a light source in green arranged in said third light incidence area.

7. An illuminating device according to claim 6, one portion of a light in green incident from said third light incidence area being emitted from a light exit area of said optical member by reflected on said first dichroic mirror or said second dichroic mirror.

8. An illuminating device according to claim 6, comprising a light integrator that renders equal an intensity of lights in respective colors emitted from said optical member on an object to be illuminated.

9. An illuminating device according to claim 8, wherein said light integrator is a rod integrator structured of being hollow or non-hollow.

10. An illuminating device according to claim 9, wherein at least one of said first dichroic mirror and said second dichroic mirror, and a side surface of said rod integrator are in parallel.

11. An illuminating device according to claim 8, wherein said integrator is formed of one pair of fly's eye lenses.

12. An illuminating device, according to claim 6, wherein said light source is formed of a solid light-emitting element.

13. An illuminating device according to claim 6, members such as a circuit board, a storing apparatus, an external-equipment attaching portion, and others being arranged in the vicinity of said light source in red.

14. An illuminating device according to claim 6, characterized in being driven by a primary battery or a secondary battery.

15. An illuminating device according to claim 6, characterized in being structured of always emitting a light in red, a light in green, and a light in blue when the illuminating device is turned on.

16. A projection type video display, comprising:

the illuminating device according to claim 15;

one full color light valve; and a projecting means for projecting an image light obtained by being passed through said full color light valve.

17. An illuminating device according to claim 6, characterized in being structured of sequentially emitting a light in red, a light in green, and a light in blue for a predetermined time period when the illuminating device is turned on.

18. A projection type video display, comprising:

the illuminating device according to claim 17;

one light valve;

a supplying means for supplying a video signals for respective colors in synchronous with emitting timings of the lights in the respective colors; and a projecting means for projecting an image light obtained by being passed through said light valve.

19. A projection type video display according to claim 16 or 18, members such as a circuit board, a storing apparatus, an external-equipment attaching portion, and others being arranged in the vicinity of said light source in red.

20. A projection type video display according to claim 16 or 18, characterized in being driven by a primary battery or a secondary battery.

* * * * *